United States Patent
Nathan

(10) Patent No.: US 8,700,518 B2
(45) Date of Patent: Apr. 15, 2014

(54) SYSTEM AND METHOD FOR TRADING FINANCIAL INSTRUMENTS USING SPEECH

(75) Inventor: Alan B. Nathan, San Francisco, CA (US)

(73) Assignee: Charles Schwab & Co., Inc., San Francisco, CA (US)

(*) Notice: Subject to any disclaimer, the term of this patent is extended or adjusted under 35 U.S.C. 154(b) by 3665 days.

(21) Appl. No.: 10/642,034

(22) Filed: Aug. 15, 2003

(65) Prior Publication Data

US 2004/0167847 A1   Aug. 26, 2004

Related U.S. Application Data

(63) Continuation of application No. 08/884,107, filed on Jun. 26, 1997, now abandoned.

(51) Int. Cl.
*G06Q 40/00*   (2012.01)

(52) U.S. Cl.
USPC ............................................. 705/37; 705/38

(58) Field of Classification Search
USPC .................................................. 705/37, 38
See application file for complete search history.

(56) References Cited

U.S. PATENT DOCUMENTS

| | | | |
|---|---|---|---|
| 3,976,840 A * | 8/1976 | Cleveland et al. | 379/93.02 |
| 4,554,418 A | 11/1985 | Toy | |
| 4,577,062 A * | 3/1986 | Hilleary et al. | 379/88.21 |
| 4,649,832 A | 3/1987 | Hain et al. | |
| 4,712,242 A * | 12/1987 | Rajasekaran et al. | 704/253 |
| 4,763,278 A * | 8/1988 | Rajasekaran et al. | 704/251 |
| 4,903,201 A * | 2/1990 | Wagner | 705/37 |
| 4,980,826 A * | 12/1990 | Wagner | 705/37 |
| 5,036,538 A | 7/1991 | Oken et al. | |
| 5,036,539 A | 7/1991 | Wrench, Jr. et al. | |
| 5,168,446 A * | 12/1992 | Wiseman | 705/37 |
| 5,181,238 A * | 1/1993 | Medamana et al. | 379/93.03 |
| 5,239,462 A | 8/1993 | Jones et al. | |
| 5,239,573 A | 8/1993 | Rangan | |
| 5,241,620 A | 8/1993 | Ruggiero | |
| 5,309,355 A * | 5/1994 | Lockwood | 705/6 |
| 5,315,634 A * | 5/1994 | Tanaka et al. | 379/93.02 |
| 5,329,608 A * | 7/1994 | Bocchieri et al. | 704/243 |
| 5,390,278 A | 2/1995 | Gupta et al. | |
| 5,457,797 A * | 10/1995 | Butterworth et al. | 719/320 |
| 5,517,406 A * | 5/1996 | Harris et al. | 705/30 |
| 5,576,951 A * | 11/1996 | Lockwood | 705/27 |

(Continued)

FOREIGN PATENT DOCUMENTS

| | | |
|---|---|---|
| WO | WO 95/06294 | 3/1995 |
| WO | WO 97/11435 | 3/1997 |

OTHER PUBLICATIONS

Anonymous, Speech System Plays the Market, May 1993, I.T. Magazine, vol. 25, Issue 4.*

(Continued)

*Primary Examiner* — William Rankins

(74) *Attorney, Agent, or Firm* — Innovation Partners; Charles E. Gotlieb

(57) ABSTRACT

A system and method automatically provides financial information to a client without requiring a service representative, increasing the efficiency and accuracy of a financial service transaction when compared to conventional systems, enabling a client to easily and efficiently provide information to the financial service provider, and enabling a financial service provider to easily and efficiently perform various financial services for a client automatically, including complex financial transactions.

13 Claims, 14 Drawing Sheets

(56) References Cited

U.S. PATENT DOCUMENTS

| | | | | |
|---|---|---|---|---|
| 6,029,146 | A * | 2/2000 | Hawkins et al. | 705/35 |
| 6,243,688 | B1 * | 6/2001 | Kalina | 705/14 |
| 6,329,608 | B1 * | 12/2001 | Rinne et al. | 174/261 |
| 7,110,981 | B1 * | 9/2006 | Sidikman et al. | 705/43 |
| 2004/0167847 | A1 * | 8/2004 | Nathan | 705/37 |

OTHER PUBLICATIONS

Reinbach, Andrew, Stock quote access via voice recognition system, Oct. 1996, Bank Systems and Technology, vol. 33, No. 10, pp. 46.*

All Ears at Mutual Funds Schmerken, Ivy. Wall Street & Technology. New York: Apr. 1992. vol. 9, Iss. 8; p. 71, 5 pgs.*

What To Do With Dividends; [3 Star Edition] Boston Globe. Orlando Sentinel. Orlando, Fla.: Jul 7, 1991. p. D.4.*

"Management and Strategy: Verbex, DEC Tap Australians for FX Deal-Capture System." Trading Systems Technology. Dec. 2, 1991. V.5 No. 11. Waters Information Services, Inc. Dialog® File 636:IAC Newsletter DB™ 01284202.

"Speech Recognition: Breakthrough in Technology to Radically Change the Way Consumers Use Their Telephones." Mar. 15, 1993. Edge Publishing. Dialog® File 16:IAC PROMT® 04410333.

"Stock Quote Access Via Voice Recognition System." Bank Systems + Technology. Oct. 1996: p. 46. Gralla Publications. Dialog® File 16:IAC PROMT® 07048049.

"InterVoice Receives $3 Million Order from E*Trade." PR Newswire. Jan. 15, 1997. Dialog® File 16:PROMT® 06627180.

"Periphonics Receives $3 Million in Orders for IVR Systems from Two Leading Discount Brokerage Firms." Business Wire. Oct. 21, 1996. Dialog® File 16:PROMT® 06479607.

"Dictionary of Finance and Investment Terms." $4^{th}$ ed. Barron's: 1995.

"Schwab TeleBroker Service." Charles Schwab TeleBroker brochure. 1993.

"Visa Hooks Banks to Nuance's Natural Speech Recognition." Voice Technology & Services News. Jan. 7, 1997: Potomac.

"Speech system plays the market." I.T. Magazine. May 1993. V. 25 Issue 5. Toronto.

Lenning, Matthew and Douglas Sharp. "Unleashing the potential of human-to-machine communication." Telesis. Dec. 1993. Issue 97. Ottawa.

Carroll, Paul B. "Technology." Wall Street Journal, Eastern Edition. Mar. 12, 1990. P.B1.

"Evolution of speech-recognition technologies." Telesis: Issue 101. Sep. 1996. Ottawa.

Anonymous. "Technology Sparks Corporate Makeovers," Upside, v10n4, pp. 104-106, Apr. 1998.

* cited by examiner

SYSTEM AND METHOD FOR TRADING FINANCIAL INSTRUMENTS USING SPEECH

CROSS-REFERENCE TO RELATED APPLICATIONS

This application is a continuation of original application Ser. No. 08/884,107 entitled, "System and Method for Automatically Providing Financial Services to a User Using Speech Signals" filed on Jun. 26, 1997 now abandoned by Alan B. Nathan, has the same assignee as the present application, and is hereby incorporated by reference in its entirety.

FIELD OF THE INVENTION

The present invention relates to speech recognition and more specifically to speech recognition for trading securities.

BACKGROUND OF THE INVENTION

Financial service providers have traditionally provided a variety of techniques for obtaining financial information and for trading financial instruments. One common technique involves having a representative of the financial institution meet directly with a customer. The representative can counsel the client in financial matters, can provide financial information to the user, e.g., stock quotes, and can execute financial transactions for the user. However, it is generally neither efficient nor necessary to have a representative directly involved in providing all financial services to a client. The cost of providing some services to a user, e.g., providing information regarding recent transactions or providing stock quotes, is time consuming and expensive when performed by a financial service representative. The cost of employing enough representatives to properly service clients is expensive. In addition, representatives are more likely to make errors than an automated process when performing certain services. For example, when providing financial information to a client or when conducting a financial transaction for a client.

In order to reduce the cost of providing financial services some financial service providers enable users to access financial information via a telephone. The user calls a financial service provider and listens to a message that describes various options, the user selects the appropriate option by depressing a data tone multiple frequency (DTMF) button on a conventional telephone touch pad. The user is then walked through various menus until the user is able to provide enough information such that the financial service provider can provide the service requested by the client. While this technique is more efficient than the having a representative meet directly with a customer, it still has several significant disadvantages. One disadvantage is that the user must provide information to the financial service provider using only a telephone touch pad. This technique is tedious and inefficient when the user attempts to input information that is not in the form of a numbered list. For example, if a user wants to obtain a quote on a stock, it is difficult for a user to input the name of stock using only a telephone touch pad since most numbers on a telephone touch pad correspond to three letters. The problem of receiving inputs from a user increases as the amount of information the client must provide to the financial service provider increases. Accordingly, the touch pad technique is not efficient for many type of complex financial transactions, e.g., option trading, where the user must input a significant amount of information.

Accordingly, what is needed is a system and method that: (1) automatically provides financial information to a client without requiring a service representative; (2) increases the efficiency of a financial service transaction when compared to conventional systems; (3) increases the accuracy of a financial service transaction when compared to conventional systems; (4) enables a client to easily and efficiently provide information to the financial service provider; (5) enables a financial service provider to easily and efficiently perform various financial services for a client automatically, including complex financial transactions.

SUMMARY OF THE INVENTION

The present invention is a system and method for automatically providing financial information to a client without requiring a service representative, increasing the efficiency and accuracy of a financial service transaction when compared to conventional systems, enabling a client to easily and efficiently provide information to the financial service provider, and enabling a financial service provider to easily and efficiently perform various financial services for a client automatically, including complex financial transactions.

The system includes a speech processor that receives a speech signal spoken by a user into a telephone and identifies the term spoken by the user by comparing the received signal with a predefined vocabulary. The speech applications interpret the recognized term and, after receiving the necessary information, the speech applications perform a requested financial service transaction and provide information to the user regarding this transaction via the telephone system, for example. Some of the financial service transactions supported by the present invention include, providing stock quotes, providing mutual fund quotes, providing option quotes, providing account information, trading stocks, trading mutual funds, and trading options. In addition, the present invention utilizes the speech recognition technology to provide a security system that prevents unauthorized access to a financial account.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number corresponds to the figure in which the reference number is first used.

Figure 1A:
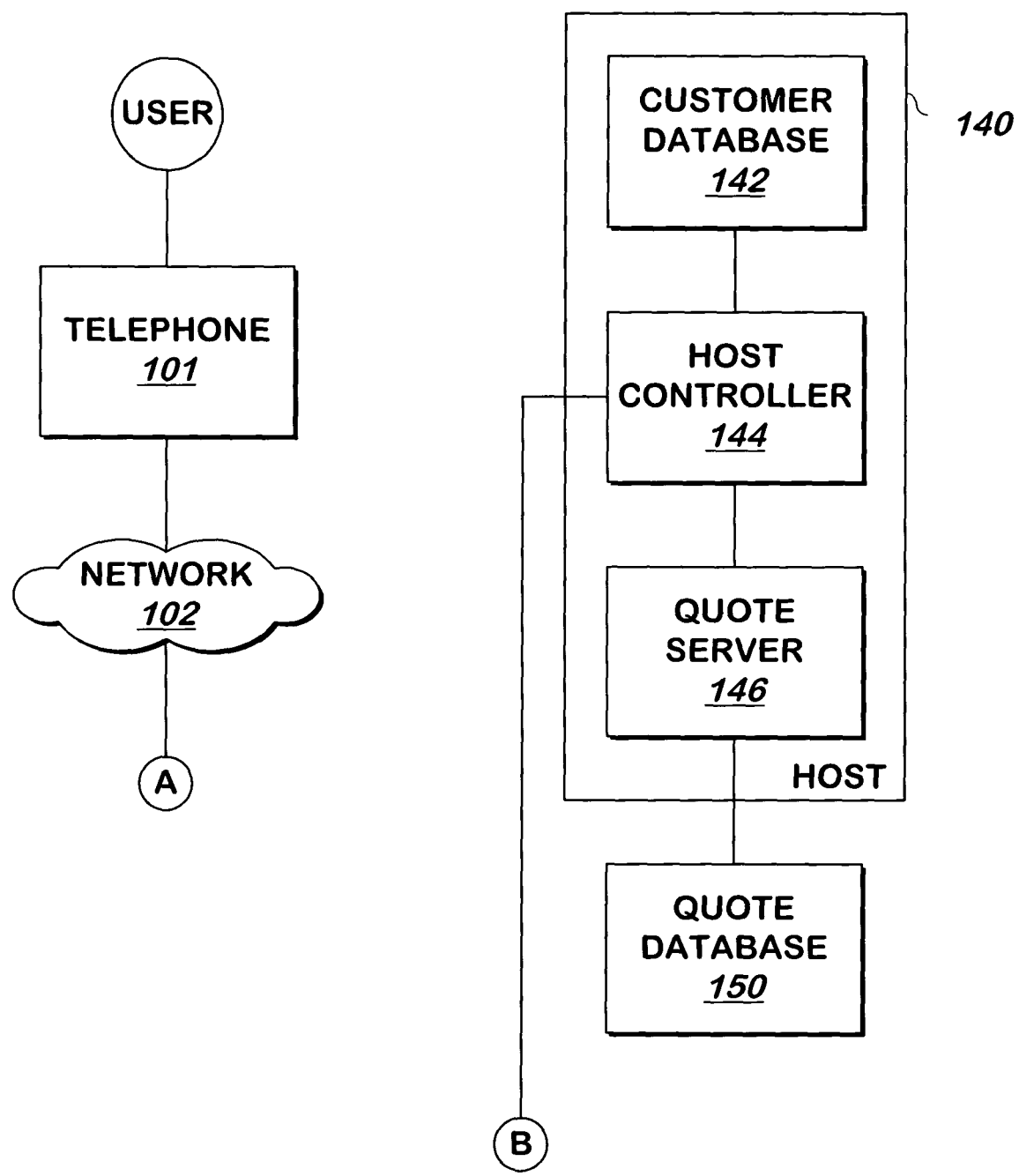
FIG. 1 is an illustration of the computer system in which the preferred embodiment of the present invention operates.
Figure 1B:
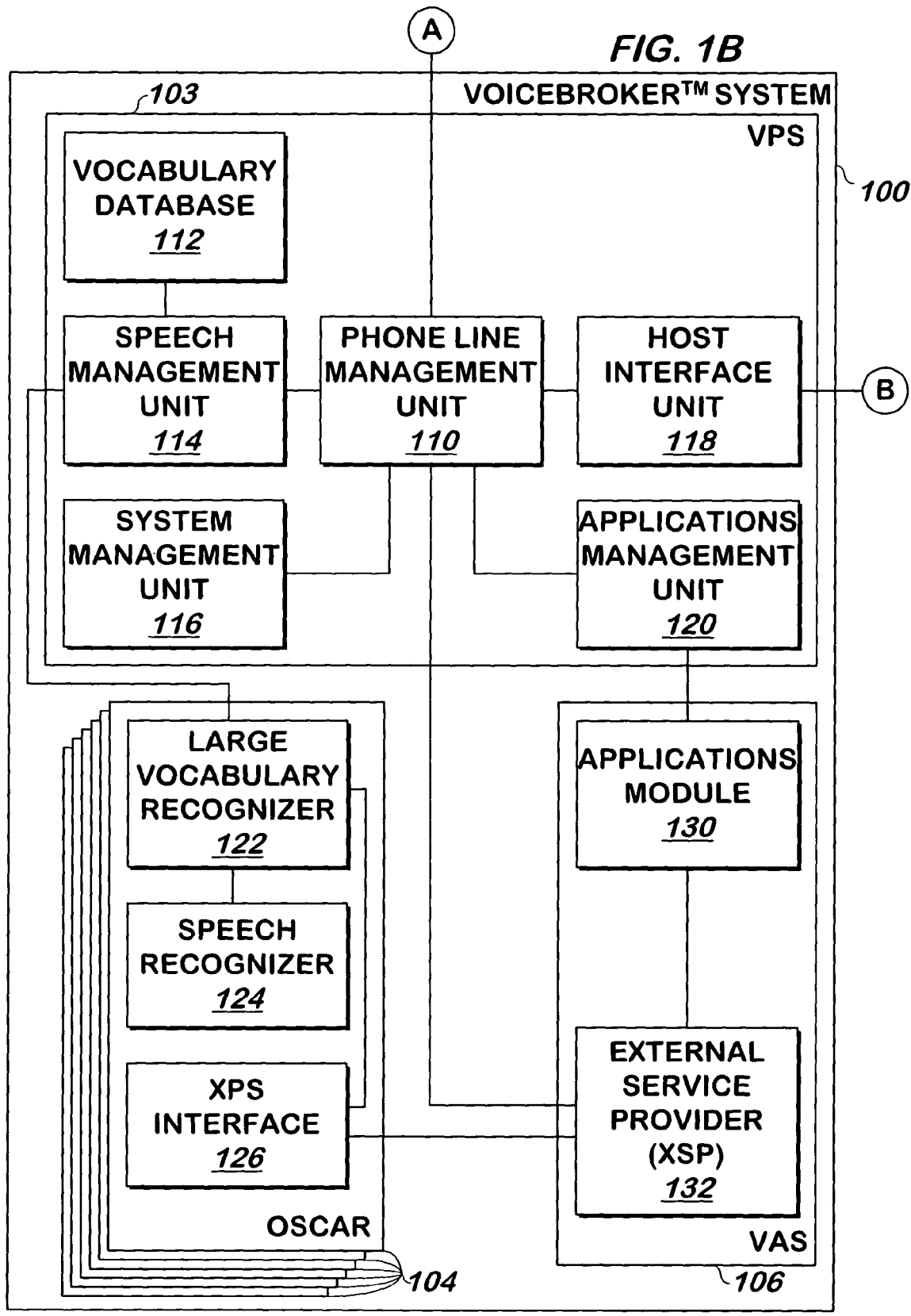

FIG. 1 is an illustration of the computer system in which the preferred embodiment of the present invention operates. FIG. 1 includes a conventional telephone 101, a wide area network 102, e.g., the plain old telephone system (POTS) or the Internet, a VoiceBroker™ system 100, a host system 140, and a quote database 150. The VoiceBroker™ system 100 includes a voice processing series (VPS) module 103 that is commercially available from Periphonics, Corporation, having a place of business at 4000 Veterans Memorial Highway, Bohemia, N.Y., several open signal computing/analysis platforms (OSCAR) 104 that are commercially available from Periphonics, Corporation, and a VPS application server (VAS) 106.

The VPS 103 includes a phone line management unit 110, a vocabulary database 112, a speech management unit 114, a system management unit 116, a host interface unit 118, and an applications management unit 120. Each OSCAR 104 includes a large vocabulary recognizer 122, a speech recognizer 124, and an external service provider (XSP) interface 126. The VAS 106 includes an applications module 130 and an external service provider (XSP) 132. The host system 140 includes a customer database 142, a host controller 144, and a quote server 146.

The VPS 103 includes a hardware platform and software modules. In the preferred embodiment, the hardware platform is the VPS 9500k computer that is commercially available from Periphonics Corporation. The software modules are identified above and are now described. The phone line management unit 110 is conventional and controls interactions between signals (calls) received from and sent to the user via the network 102 and schedules operations involving the applications management unit 120, the host interface unit 118, the speech management unit 114, the system management unit 116, and the XSP 132. The vocabulary database 112 stores digital representations of the terms that the VoiceBroker™ system 100 can use in conversations with the user, e.g., when querying the user. Examples of terms in the vocabulary database 112 includes stock names, mutual fund names, numbers, and other prompts. The speech management unit 114 routes speech signals received from the network 102 to the OSCARs 104 and generates outgoing prompts and queries to the user in response to requests from the applications module 130, as described below. The system management unit 116 manages the overall operations of the VoiceBroker™ system 100 including system interaction, statistics gathering and reporting, and alarm monitoring. The host interface unit 118 controls communication between the VPS 103 and the host system 140. The applications management unit 120 controls the execution of the applications in the applications module 130.

In the preferred embodiment, each OSCAR 104 includes both hardware unit and software modules. In the preferred embodiment, the hardware unit is an UltraSPARC 1 model computer which is commercially available from Sun Microsystems, Inc., Mountain View, Calif. The software modules include the large vocabulary recognizer 122, the speech recognizer 124, and the XSP interface 126. The large vocabulary recognizer 122 is an interface between the speech recognizer 124 and the speech management unit 114. The speech recognizer 124 is a conventional speech recognizer and is commercially available from Nuance Communications, located in Menlo Park, Calif. Although the speech recognizer 124 is conventional, some of the acoustic models used to convert the audio signal into standard phones and the grammar necessary to understand the audio signal is based upon the requirements of the VoiceBroker™ system. For example, in the preferred embodiment of the present invention the acoustic models and grammar are generated based upon the likely terms that the user will speak, e.g., the names of stocks (including alternative names for each stock) and the grammar is similarly based upon the information requested by the applications module 130. It will be apparent to persons skilled in the art how to generate acoustic models and a proper grammar given the description of the system and the requirements of the applications module 130 set forth herein. The XSP interface 126 is commercially available from Periphonics, Corporation and is the communication interface between each OSCAR 126 and the XSP 132.

The VAS 106 includes a hardware platform and software modules. In the preferred embodiment the hardware platform is SPARC 5 workstation that is commercially available from Sun Microsystems. The software modules include the XSP 132 and the applications module 130. The XSP 132 is commercially available from Periphonics Corporation and controls the communication between the VAS 106 and each OSCAR 104. In the preferred embodiment, the applications module 130 is stored in conventional random access memory (RAM) and performs non-conventional functions. The functions performed by the applications module 130 is described in greater detail below with respect to FIGS. 2-11.

The host system 140 is a computer system that stores customer records, provides access to quote data, and processes information as requested by the applications module 130. The host system includes a hardware platform and software modules. In the preferred embodiment the hardware platform is a mainframe computer, e.g., an IBM 90219×2 that is commercially available from IBM Corporation, Armonk, N.Y., or a Hitachi 72, commercially available from Hitachi, Tokyo, Japan. The software in the host system 140 includes a customer database 142 that includes account information for the users, a host controller 144 that controls communications between the VPS 103 and the host system 140, accesses requested account information, and instructs the quote server to retrieve recent quote data, and a quote server 146 that requests quote data from the quote database 150. The quote database stores recent quote data for financial instruments including stocks, bonds, mutual funds, and options, and, in the preferred embodiment, is updated frequently, e.g., multiple times per minute.

As described above, the user accesses the VoiceBroker™ system 100 via a telephone 101. In an alternate embodiment any device capable of transmitting audio signals to a network 102, e.g., a personal computer with audio signal capability, can be used by the user. A user may be requested to provide information by speaking into the telephone 101. The speech signal of the user is converted into an electromagnetic audio signal and is transmitted over the network 102. In one embodiment of the present invention, the audio signal is converted into a digital audio signal. The audio signal is received by the phone line management unit 110 which routes the audio signal to the speech management unit 114 which routes the audio signal to large vocabulary recognizer 122 in one OSCAR 104. The large vocabulary recognizer 122 is an interface with the speech recognizer 124.

The speech recognizer 124 receives the audio signal and converts the audio signal into terms that are part of the vocabulary of the VoiceBroker™ system 100. The operation of a speech recognizer 124 is understood by persons skilled in the art. The speech recognizer 124 converts the audio signal into a sting of standard phones using a set of acoustic models that the speech recognizer has "learned" based upon many transcribed utterances. The phones are combined into words according to a phone-to-word "dictionary" and these words are combined to make phrases that correspond to what the user said according to a predefined recognition grammar that is stored in a grammar library in the speech recognizer 124. The recognized word or phrase is called a spoken term. The spoken term is transmitted to the application in the applications module 130 that requested information from the user. The phrase "spoken term" refers to the recognized term or phrase based upon an audio signal received from a user.

The application can then utilize the information in the term and can request additional information. The applications can request additional information from, or can provide information to, the user by generating a signal that requests that certain recordings in the vocabulary database 112 be transmitted to the user. The application in the applications module 130 transmits the request signal to the applications management unit 120 that transmits the request to the speech management unit 114 via the phone line management unit 110. The speech management unit 114 selects the appropriate recordings, e.g., a query or a stock quote, generates a response signal, and transmits the response signal to the phone line management unit 110 that transmits the response signal to the user via the network 102. It is envisioned that the flow of signals may vary from what is described above and that some functions may be added or deleted without departing from the present invention. The process described above represents what occurs when an application queries a user.

Figure 2:
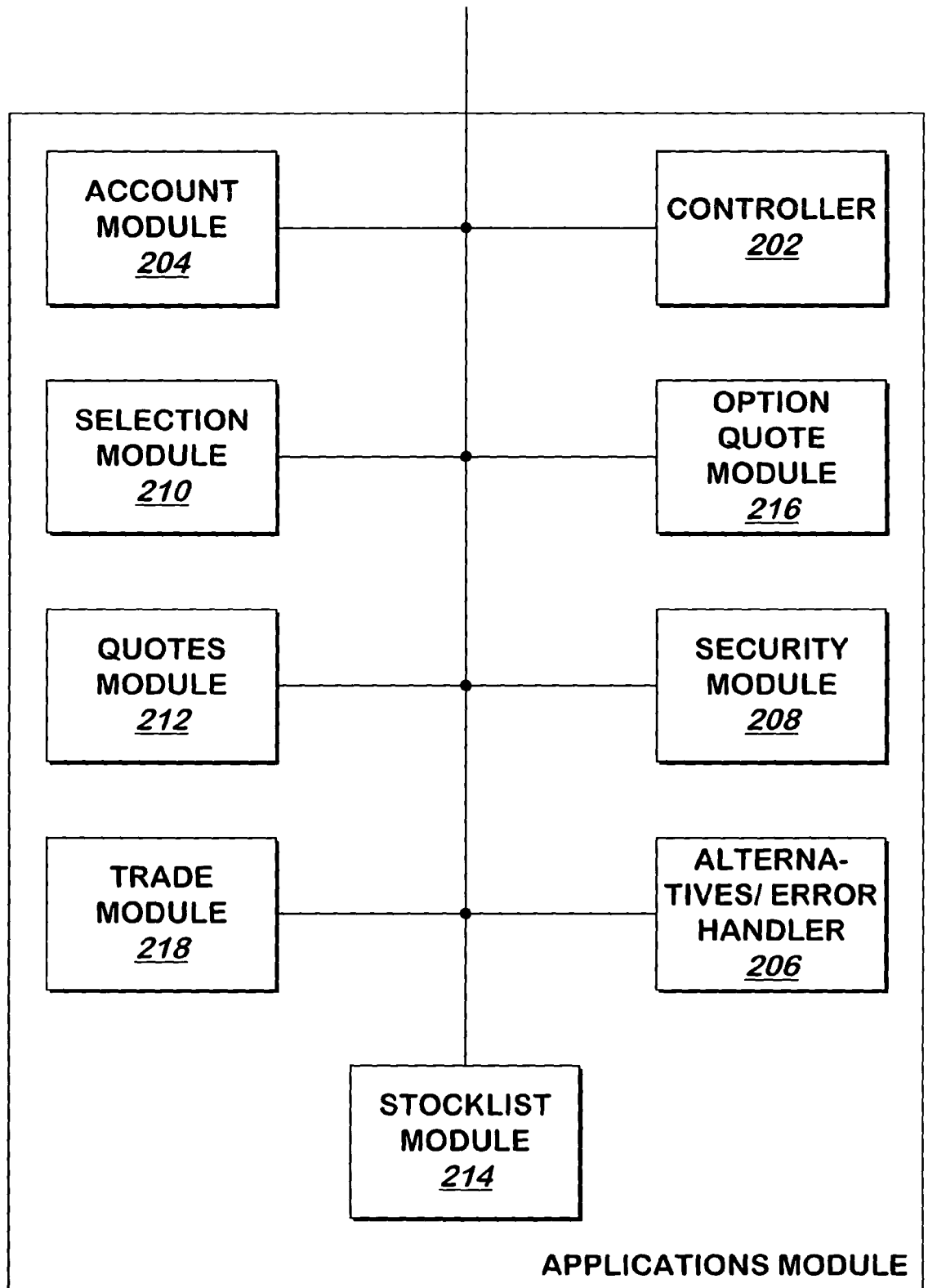
FIG. 2 is a more detailed illustration of an applications module according to a preferred embodiment of the present invention.

FIG. 2 is a more detailed illustration of the applications module 130 according to a preferred embodiment of the present invention. In the preferred embodiment, the applications module 130 includes a controller 202, an account module 204, an alternatives/error hander (A/EH) 206, a security module 208, a selection module 210, a quotes module 212, a stocklist module 214, an option quote module 216, and a trade module 218. The operation of each of the applications in the applications module 130 is described in detail below with reference to FIGS. 3-11. The controller 202 controls communications between the applications module 130 and the XSP 132 and the applications management unit 120. In addition, the controller 202 controls the operation of the applications in the applications module 130. The operation of the controller 202 is now described in greater detail with reference to FIG. 3.

Figure 3:
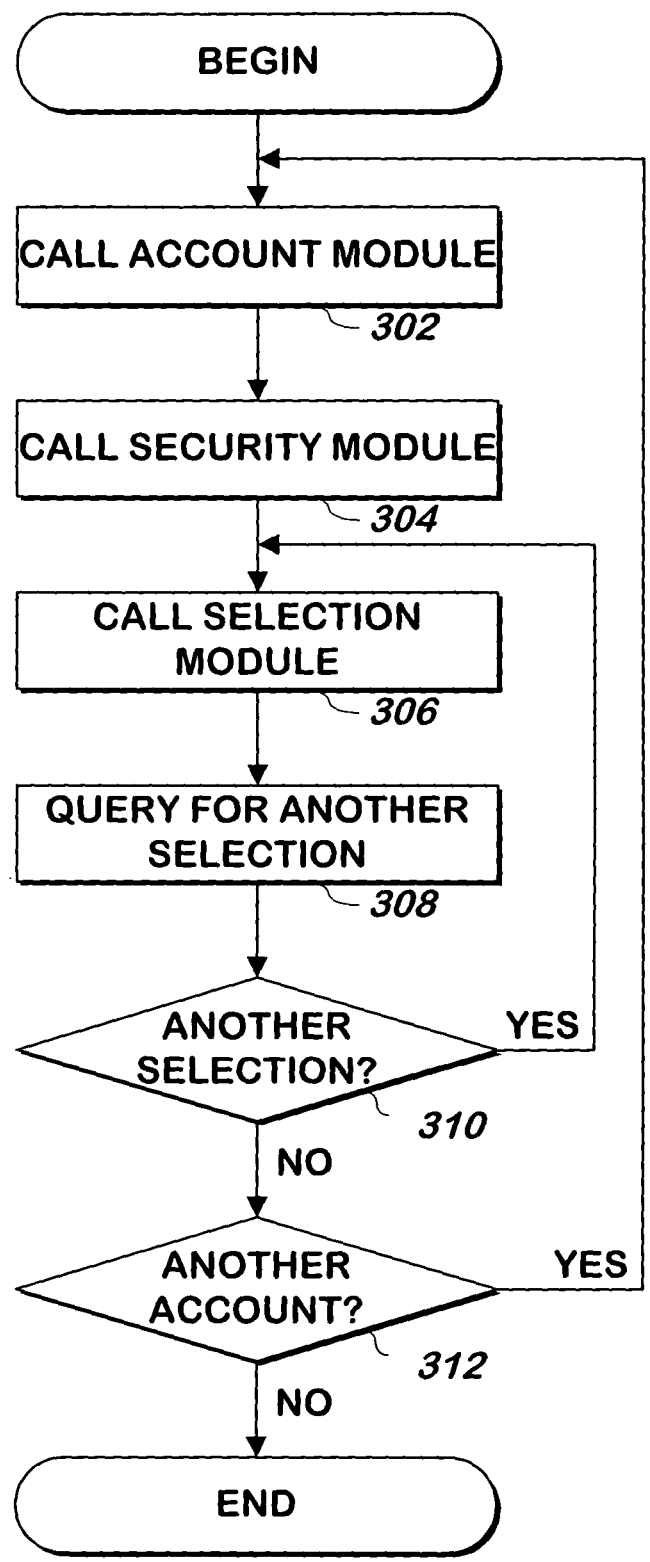
FIG. 3 is a flow chart illustrating a process performed by a controller according to a preferred embodiment of the present invention.

FIG. 3 is a flow chart illustrating a process performed by the controller 202 according to a preferred embodiment of the present invention. The controller 202 first calls 302 the account module 204. The operation of the account module 204 is described below with reference to FIG. 4. After successfully completing the account module 204, the controller 202 calls 304 the security module 208. The operation of the security module 208 is described below with reference to FIG. 6. After successfully completing the security module 208 the controller 202 calls 306 the selection module 210. The operation of the selection module 210 is described below with reference to FIGS. 7-11. After completing the selection module 210 the controller 202 queries the user for another selection and calls 306 the selection module 210 if another selection is received. If another selection is not received the controller 202 asks if the user wants to access another account. If the user wants 312 to access another account the controller 202 repeats its process and calls 302 the account module 204. If the user does not want to access another account the controller 202 terminates the call. As described above, when a call is initiated, the controller 202 calls 302 the account module 204. The operation of the account module 204 is now described.

Figure 4:
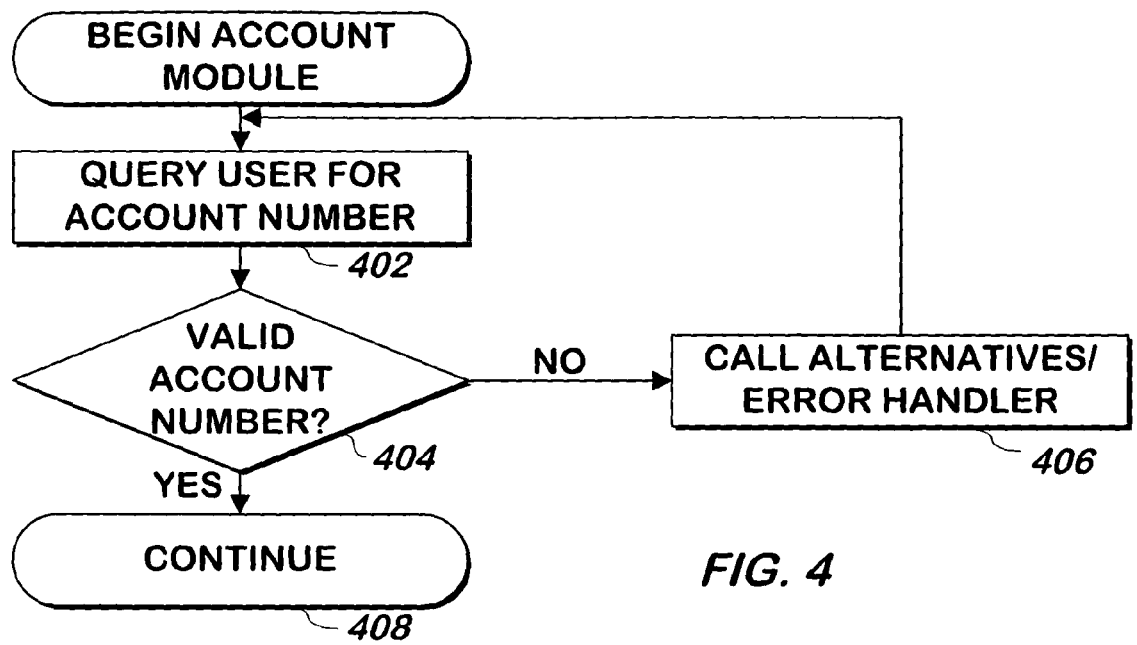
FIG. 4 is a flow chart illustrating a process performed by an account module according to a preferred embodiment of the present invention.

FIG. 4 is a flow chart illustrating a process performed by the account module 204 according to a preferred embodiment of the present invention. The account module 204 queries 402 the user for the user's account number using the procedure described above, for example. The user speaks into the telephone 101 and the VoiceBroker™ system 100 identifies the term spoken by the user. The account module 204 then determines 404 if the spoken term corresponds to a valid account number by accessing the customer database 142. If the spoken term is a valid account number the process continues 408 and process control returns to the controller 202. If the spoken term is not a valid account number the account module 204 calls 406 the alternatives/error handler (A/EH) 206.

Figure 5:
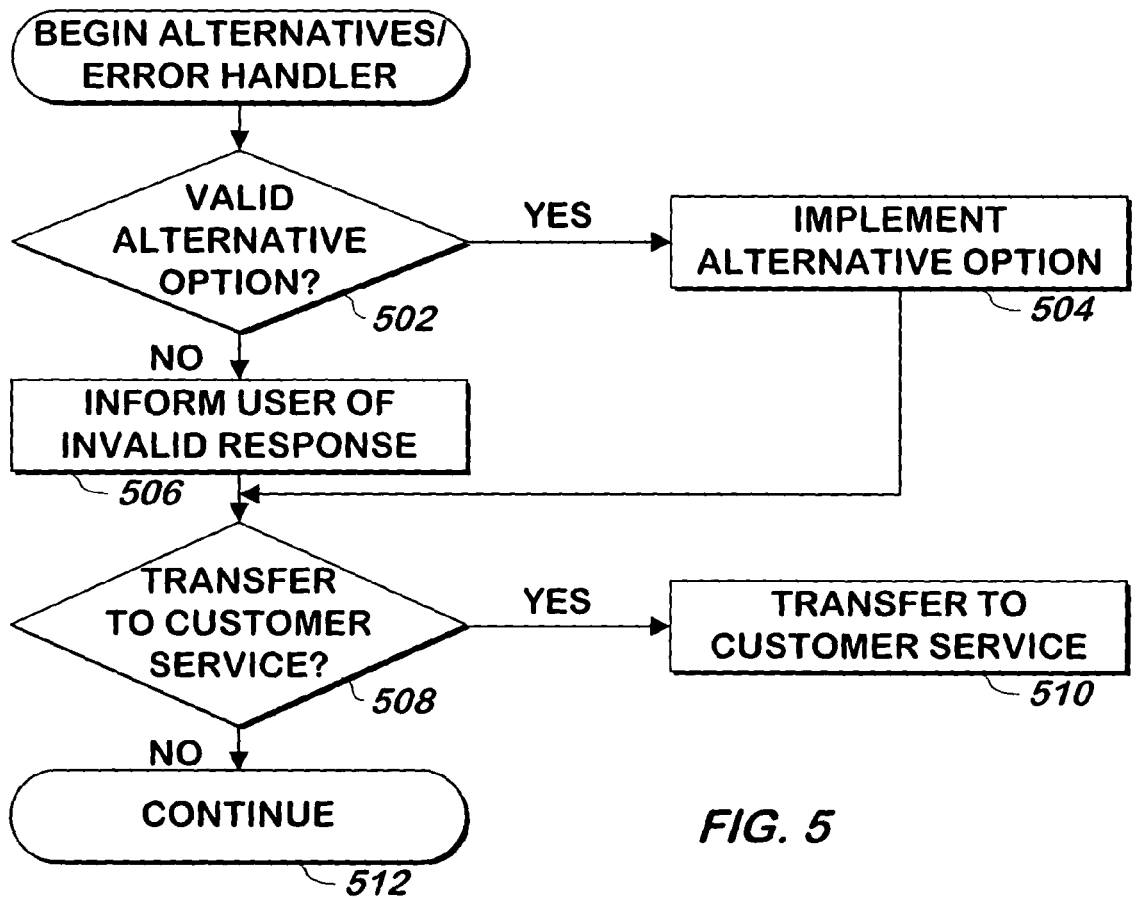
FIG. 5 is a flow chart illustrating a process performed by an alternatives/error handler according to a preferred embodiment of the present invention.

FIG. 5 is a flow chart illustrating a process performed by the alternatives/error handler 206 according to a preferred embodiment of the present invention. The alternatives/error handler 206 manages the procedure for handling spoken terms that do not answer the most recent query. For example, in the preferred embodiment the user has the option of requesting help in answering a query. In response to a "help" request the alternatives/error handler 206 will generate a message that will provide more information to the user that is related to the question asked. This is one type of alternate option that is available to the user. In some contexts other alternate options are also available to the users. For example, after the user has satisfied the security module 208 the user can return to a main menu, e.g., the selection module 210, by speaking the words "main menu" at any time. The user can similarly transfer to a specific module to perform a specific function within the VoiceBroker™ system 100 by speaking a predetermined term, e.g., "trade." The user may also modify the user's security code at any time after successfully completing the security module 208. Another option enables the user to transfer to a customer service representative by saying the phrase "customer service" or a similar term/phrase, e.g., "representative", "agent", "service", "transfer", or "broker". If the alternatives/error handler 206 determines 502 that the spoken term is a valid alternate option then the alternatives/error handler 206 calls the appropriate function to implement 504 the function. If the spoken term is not a valid alternate option the alternatives/error handler 206 informs 506 the user that the spoken term is an invalid response and determines 508 if the user should be transferred to a customer service representative. The user is automatically transferred to a customer service representative if the user does not answer a question correctly after a number of attempts. The number of attempts can vary depending upon the context of the system, e.g., if the process of the security module 208 is being implemented then the number of incorrect responses that will cause the alternatives/error handler 206 to transfer the user to customer service may be less than other, less critical, contexts. If the alternatives/error handler 206 determines 508 that the user should be transferred to a customer service representative, the alternatives/error handler 206 transfers 510 the user. If the alternatives/error handler 206 determines 508 that such a transfer is not necessary than the process continues and control passes to the module that called the alternatives/error handler 206. For example, if the account module 204 calls 406 the alternatives/error handler 206, when the alternatives/error handler 206 continues 512, the account module 204 will again query 402 the user for the account number and the process continues until either a correct account number is spoken or the alternatives/error handler 206 transfers 510 the user to a customer service representative. As described above, if the spoken term identifies a valid account number the account module 204 continues 408 and the controller 202 calls 304 the security module 208. The operation of the security module 208 is now described.

Figure 6:
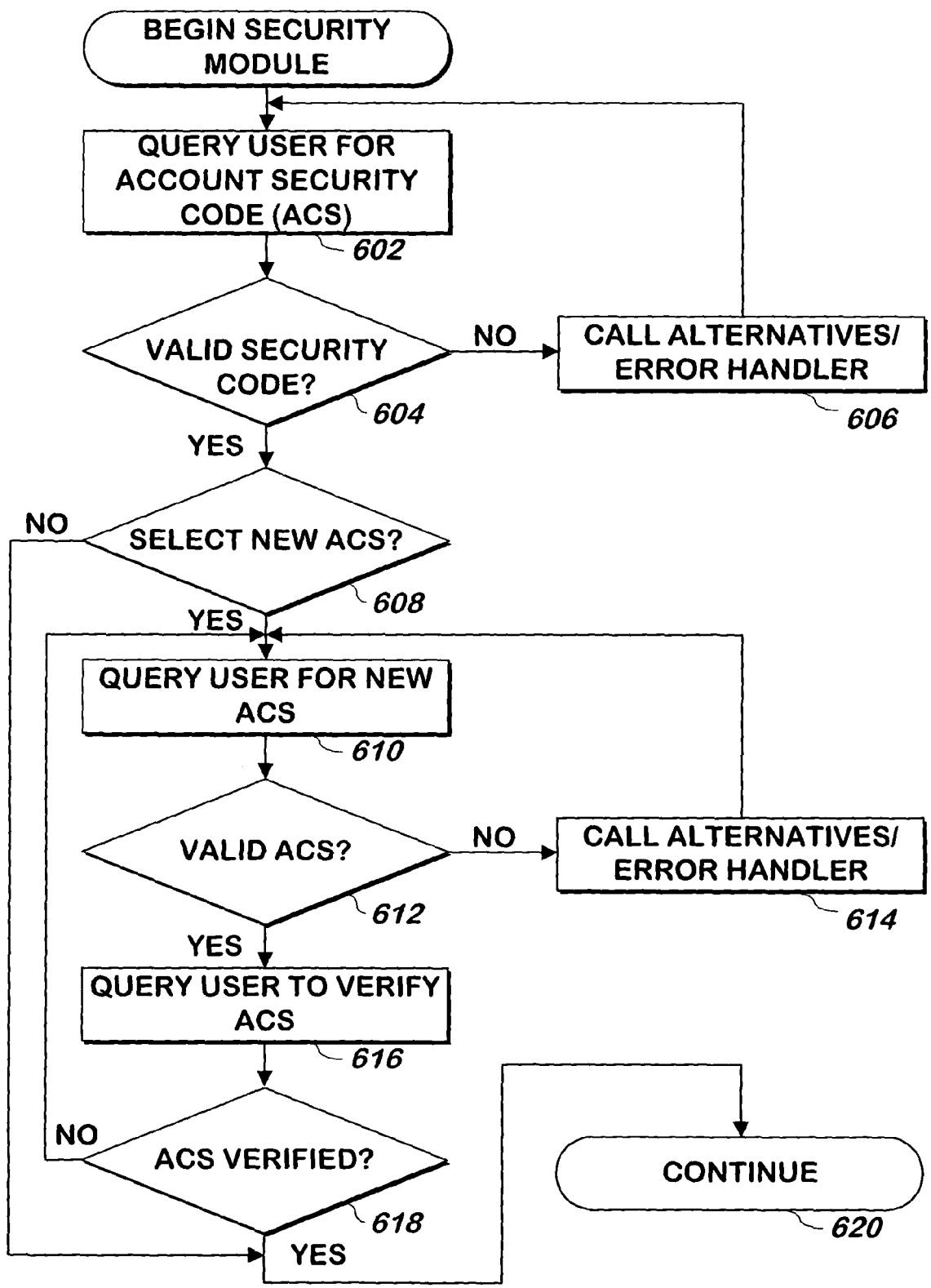
FIG. 6 is a flow chart illustrating a process performed by a security module according to a preferred embodiment of the present invention.

FIG. 6 is a flow chart illustrating a process performed by the security module 208 according to a preferred embodiment of the present invention. The security module 208 queries 602 the user for an account security code. The account security code can be a combination of numbers or words, for example. The first time a user accesses the VoiceBroker™ system 100 a security code may not exist. In such a situation the security code can be a predefined code, e.g., the last several digits of the users social security number or home phone number. The user will then be requested to select a new security code as described below. After the security module 208 asks the user for an account security code the user replies by speaking the security code. The VoiceBroker™ system 100 identifies the term spoken, as described above. The security module 208 compares the spoken term with the security code stored in the customer database 142. If the spoken term is not the valid security code, the security module 208 calls 606 the alternatives/error handler 206. As described above, the alternatives/error handler 206 determines 502 if a spoken term corresponds to an alternate option in which case the alternate option is implemented 504. Otherwise, the user is informed 506 that the spoken term does not correspond to the proper security code and the user is either transferred 510 to a customer service representative or the process continues 512 and the security module 208 repeats the query 602 for the account security code.

If the spoken term matches the account security code the user has the option 608 to select a new account security code. If the user selects to enter a new security code, or if this is the first access to the VoiceBroker™ system 100, the security module 208 asks 610 the user for the new account security code. The security module 208 then determines 612 whether the spoken term is a valid security code, e.g., in the preferred embodiment the last four digits of the user's social security number is not a valid security code. Alternately if words can be a security code the term "help" may not be a valid security code since it has an independent meaning in the VoiceBroker™ system 100. If the spoken term is not a valid account security code 612, the security module 208 calls 614 the alternatives/error handler 206. The alternatives/error handler 206 proceeds as described above. If the spoken term is a valid account security code the security module 208 asks 616 the user to verify 616 the new account security code by repeating the term, for example. The security module 208 determines if the account security code is verified 608. If verified, the process continues 620. If the account security code is not verified steps 610-618 are repeated. If the user does not want to select a new account security code 608 the process continues and the controller 202 calls 306 the selection module 210.

Figure 7:
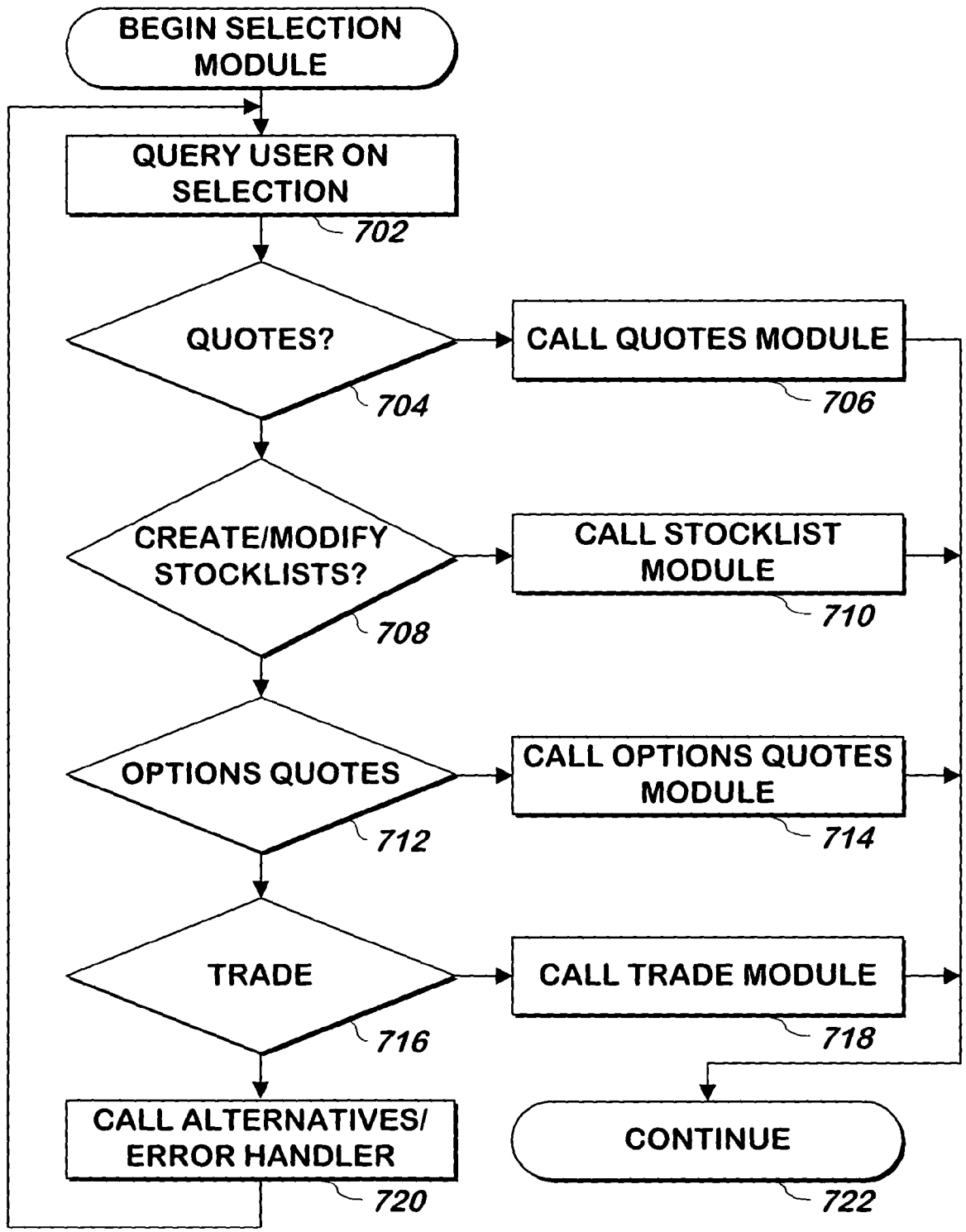
FIG. 7 is a flow chart illustrating a process performed by a selection module according to a preferred embodiment of the present invention.

FIG. 7 is a flow chart illustrating a process performed by the selection module 210 according to a preferred embodiment of the present invention. The selection module 210 queries 702 the user to select an activity. If the spoken term indicates that the user wants to obtain a quote 704, the selection module 210 calls 706 the quotes module 212. If the spoken term indicates that the user wants to create or modify a stocklist 708, the selection module 210 calls 710 the stocklist module 214. If the spoken term indicates that the user wants to obtain an option quote 712, the selection module 210 calls 714 the option quote module 216. If the spoken term indicates that the user wants to trade a financial instrument 716, the selection module 210 calls 718 the trade module 218. If the spoken term does not correspond to any of these options, the selection module 210 calls 720 the alternatives/error handler 206. As described above, if the spoken term indicates that the user wants to obtain a quote 704 the selection module 210 calls 706 the quotes module 212. The process performed by the quotes module 212 is now described.

Figure 8:
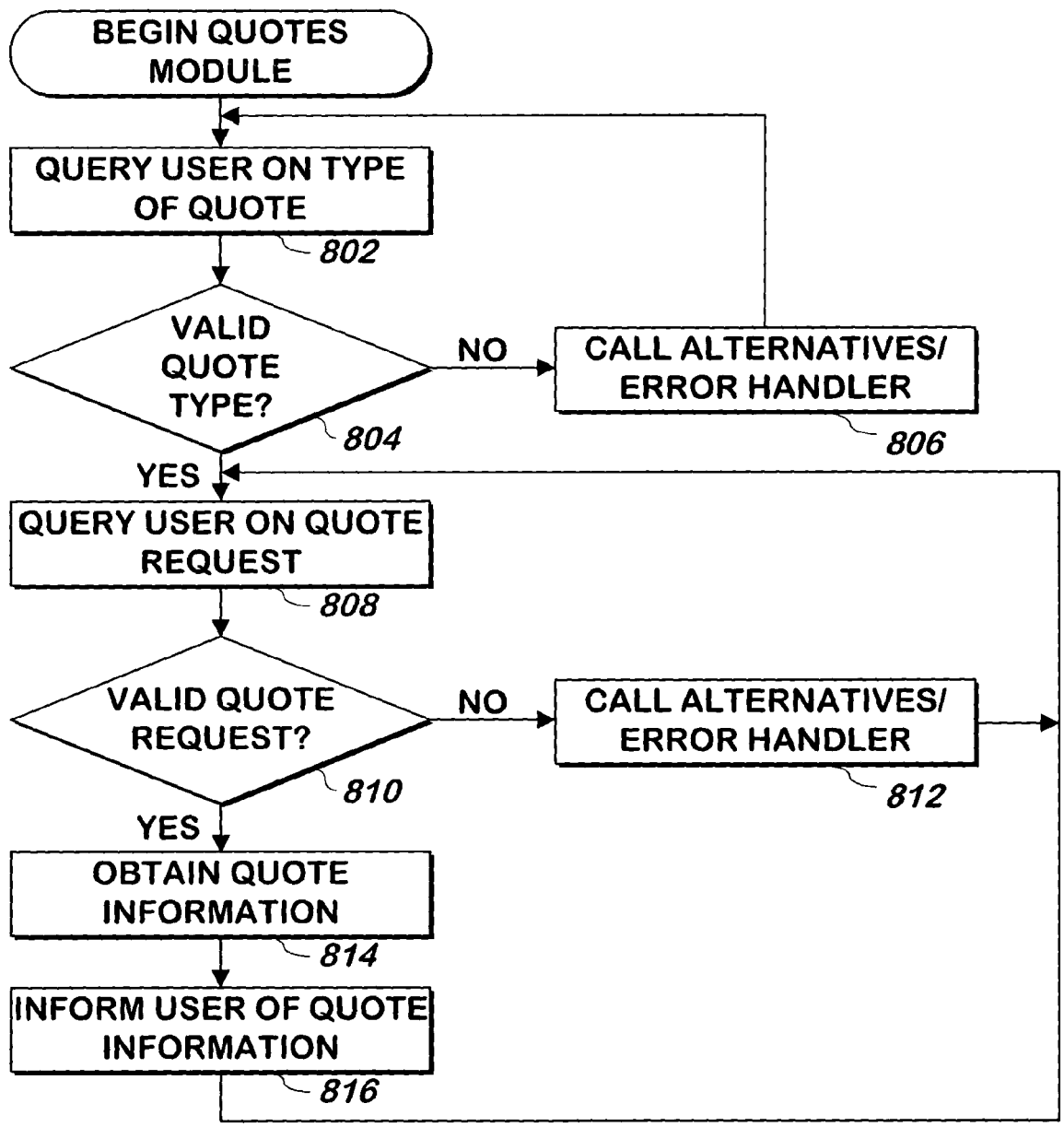
FIG. 8 is a flow chart illustrating a process performed by a quotes module according to a preferred embodiment of the present invention.

FIG. 8 is a flow chart illustrating a process performed by a quotes module 212 according to a preferred embodiment of the present invention. If the user wants to obtain a quote the quotes module 212 queries 802 the user on the type of quote. In the preferred embodiment two types of quotes are available, short quotes and full quotes. The difference is the amount of information sent to the user. For example, a short quote can include the name of the financial instrument, quote flags—a set price or volume alert for a financial instrument or stocklist—, the price, and the recent variance in the price. A long quote can include all of the short quote information along with the bid price, the asking price, the high and low value over a set period, and the trading volume, for example.

The quotes module 212 determines 804 if the spoken term is a valid quote type. If not, the quotes module 212 calls 806 the alternatives/error handler 206. If the spoken term is a valid quote type, the quotes module 212 stores such information in volatile memory and queries 808 the user on the quote request. The quote request is a name of a financial instrument. In the preferred embodiment, option quotes are handled separately (see discussion below). However, in an alternate embodiment option quotes can be handled in the quotes module 212 by modifying the information requested from and transmitted to the user. The preferred embodiment recognizes a variety of names for each financial instrument. For example, the user can refer to a stock by its full company name, by a shortened company name, a slang of the company name, or by the ticker reference. As described above, these alternatives are stored in the speech recognizer 124. The quotes module 212 determines 810 if the spoken term is a valid quote request. If not, the quotes module 212 calls 812 the alternatives/error handler 206. If the spoken term is a valid quote request the quotes module 212 obtains 814 quote information on the requested financial instrument. As described above, the quote database includes recent quote information. The quotes module 212 generates a quote request signal that is transmitted through the VPS 103 to the host system 140. The quote server 146 in the host system 140 accesses the quote database to obtain the quote information and transmits a signal representing this information to the quotes module 212 via the VPS 103. The quotes module 212 then transmits the quote information to the user in the manner described above. In the preferred embodiment, process control remains with the quotes module 212 and the user is asked 808 for another quote request. As described above, the user can exit the quotes module 212 by requesting an alternate option, e.g., "trade" or "main menu."

Figure 9:
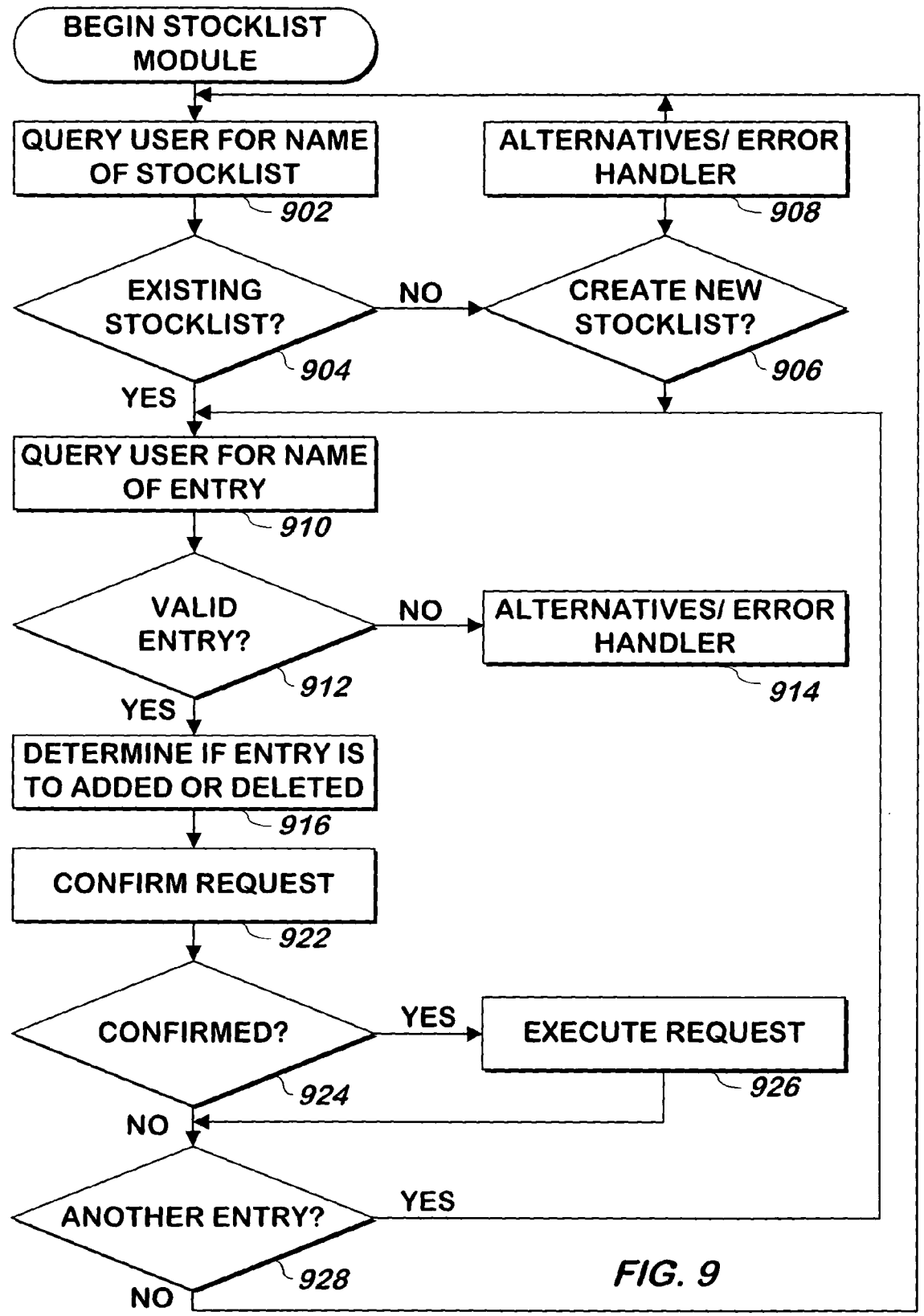
FIG. 9 is a flow chart illustrating a process performed by a stocklist module according to a preferred embodiment of the present invention.

As described above, if, when the selection module 210 has process control, the spoken term indicates that the user requested to create or modify a stocklist, the selection module 210 calls 710 the stocklist module 214. The process performed by the stocklist module 214 is now described. FIG. 9 is a flow chart illustrating a process performed by a stocklist module 214 according to a preferred embodiment of the present invention. In the preferred embodiment the user is permitted to define one or more lists of financial instruments. This list is called a stocklist. The user can then obtain a quote for each of the financial instruments in the list. For example, with respect to FIG. 8, a valid quote request can be the name of a stocklist. The quotes module 212 then obtains 814 quote information on all of the financial instruments in the stocklist and informs 816 the user of the quotes. If the user requests to create or modify a stocklist, the stocklist module 214 queries 902 the user for the name of a stocklist. As indicated above, each account can have many stocklists. The stocklist module 214 determines 904 if the spoken term is an existing stocklist. If not, the stocklist module 214 determines if the user wants to create 906 a new stocklist by determining if the spoken term is a valid stocklist name and by possibly querying the user. If the stocklist module 214 determines 906 that the user does not want to create a new stocklist the stocklist module 214 calls 908 the alternatives/error handler 206.

If the spoken term is either an existing stocklist or the user wants to create a new stocklist, the stocklist module 214 asks 910 the user for the name of an entry. The stocklist module 214 determines 912 if the spoken term is a valid entry. A valid entry is the name of a financial instrument, e.g., a stock name, a mutual fund name, a market indicator (e.g., the Dow Jones Industrial Average), or an option name. If the spoken term is not a valid entry the stocklist module 214 calls 914 the alternatives/error handler 206. If the spoken term is a valid entry the stocklist module 214 determines 916 if the valid entry is to be added or deleted to the stocklist by comparing the valid entry with the existing entries in the stocklist. If the valid entry coincides with an existing entry the stocklist module 214 determines 916 that the entry should be deleted, otherwise the valid entry should be added to the stocklist. The stocklist module 214 queries 922 the user to confirm the request. If the received spoken term confirms 924 the request the stocklist module 214 executes 926 the request. If the spoken term does not confirm the request the stocklist is not modified. The user then decides 928 whether to continue modifying the same stocklist or to modify a different stocklist. If the user decides to modify the same stocklist the stocklist module 214 process returns to step 910. Otherwise the process returns to step 902 and the user is queried for a stocklist name. As described above, the user can exit the stocklist module 214 by speaking the name of an alternate option.

Figure 10:
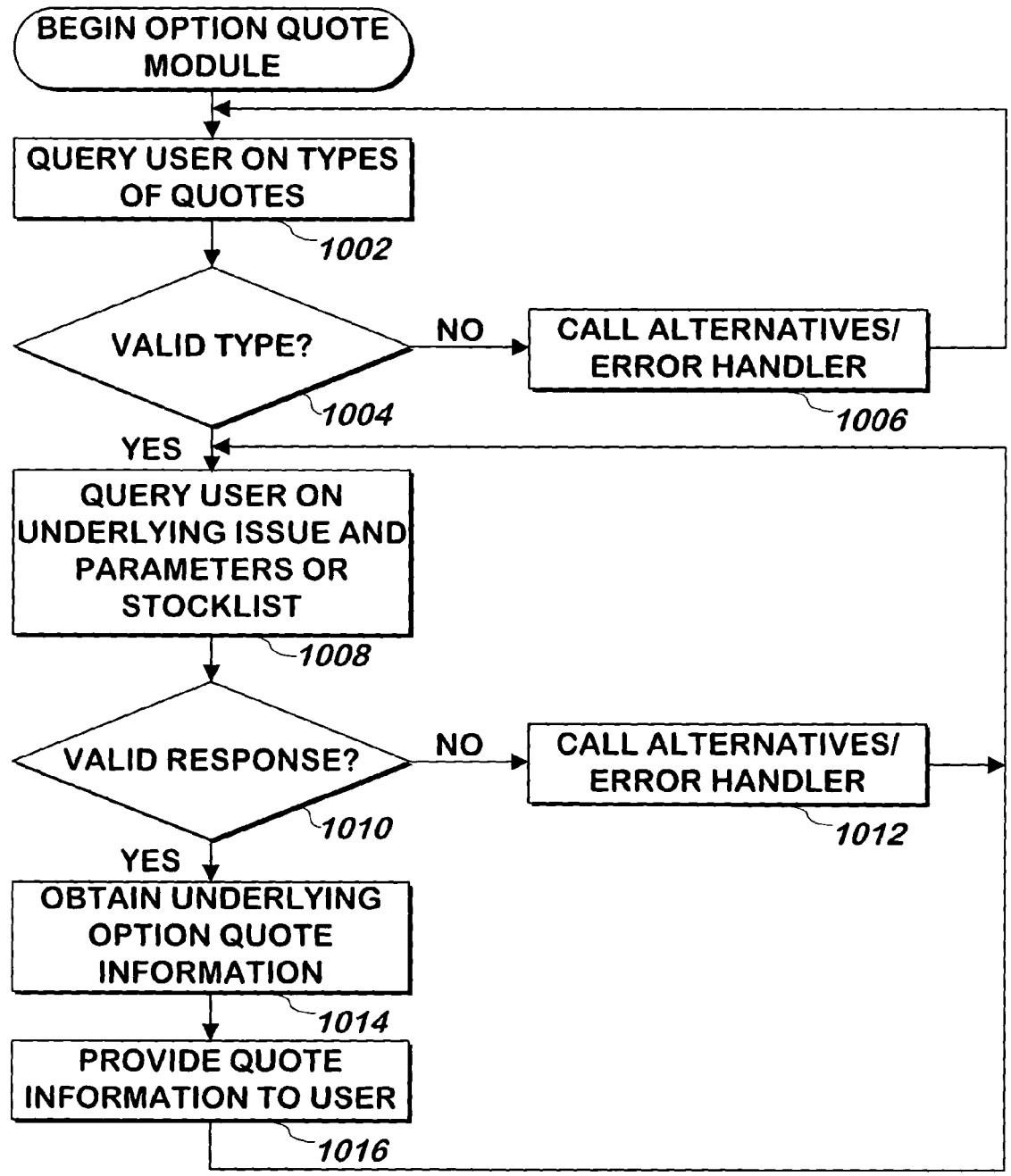
FIG. 10 is a flow chart illustrating a process performed by an option quote module according to a preferred embodiment of the present invention.
Figure 11A:
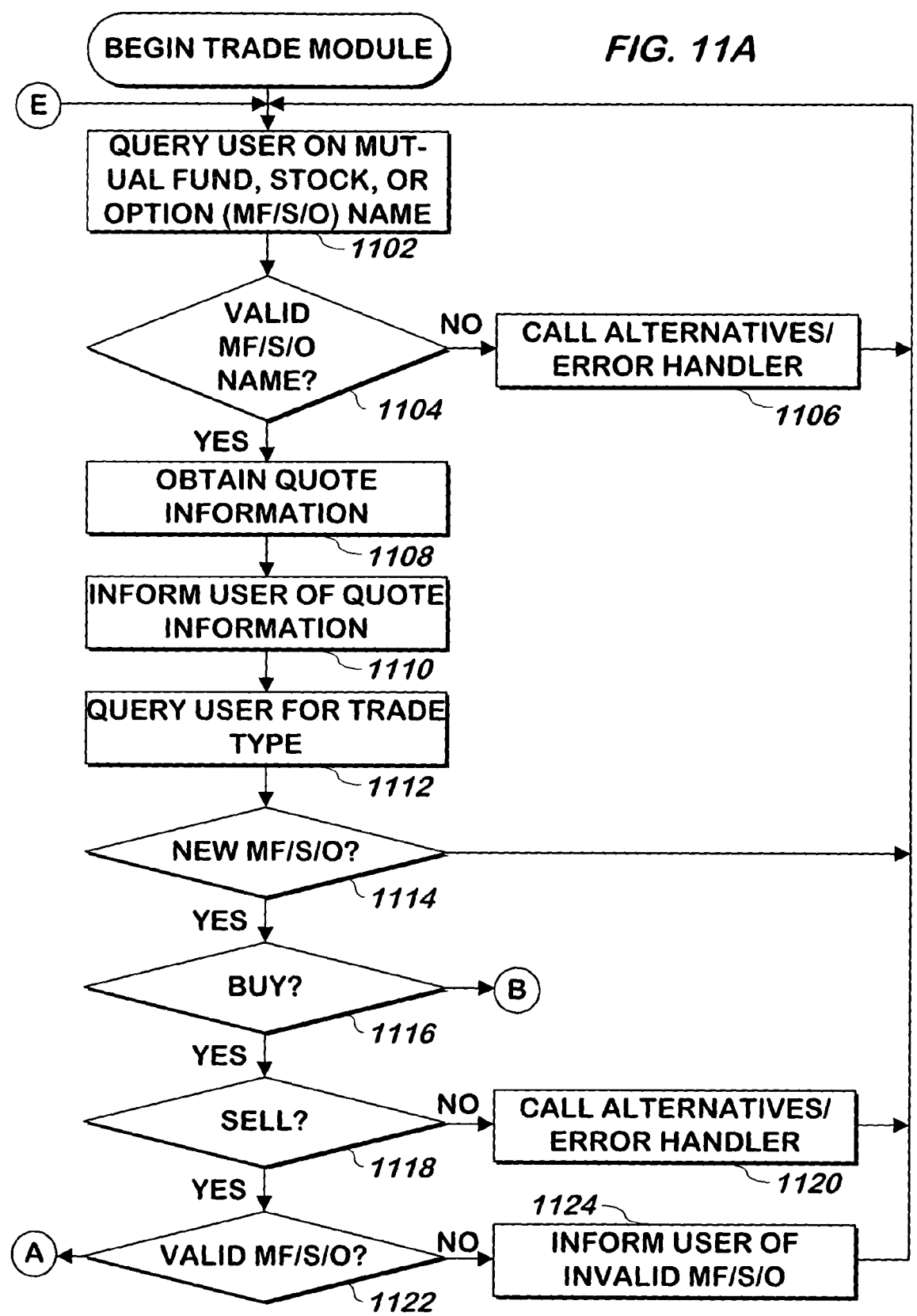
FIGS. 11A-D are flow charts illustrating a process performed by a trade module according to a preferred embodiment of the present invention.
Figure 11B:
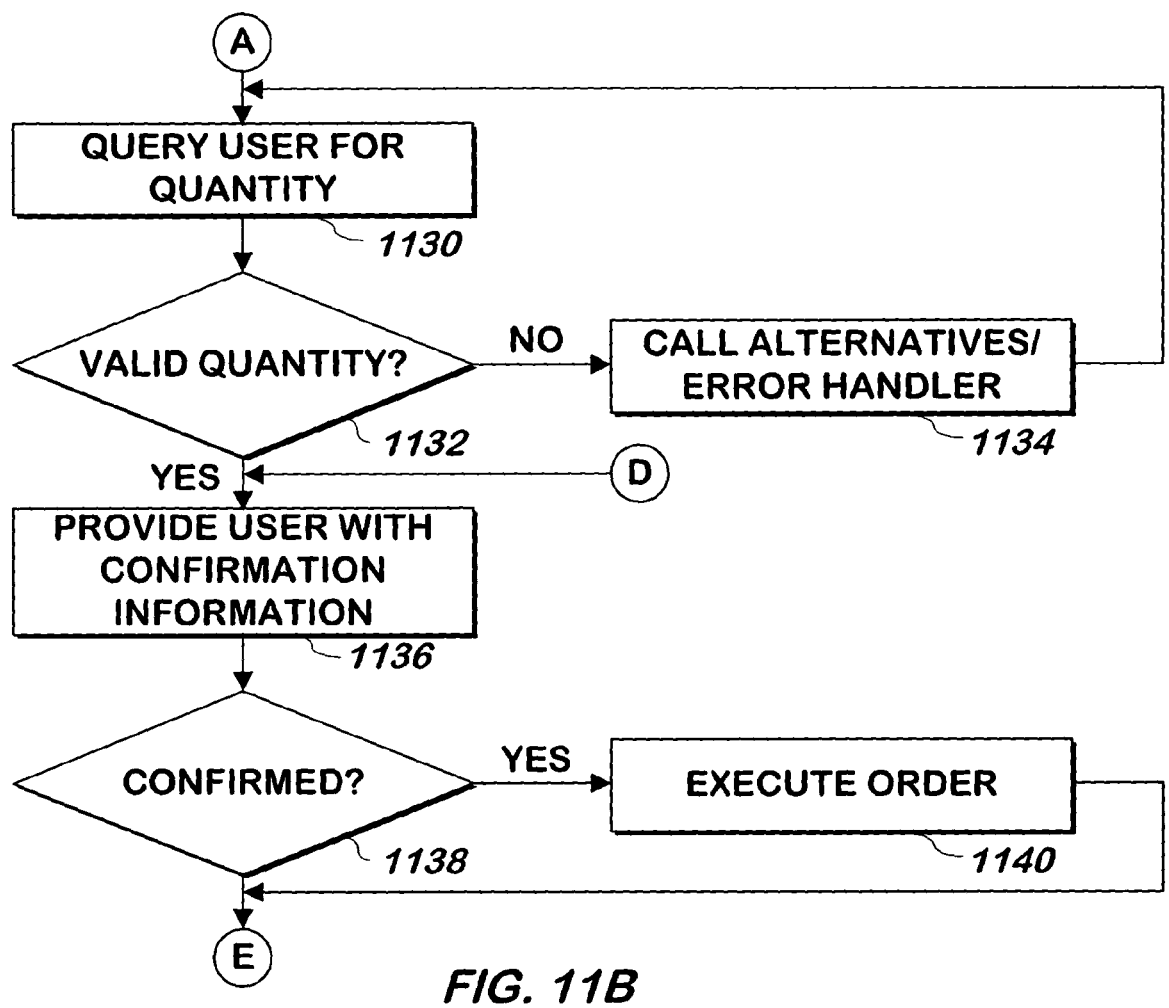
Figure 11C:
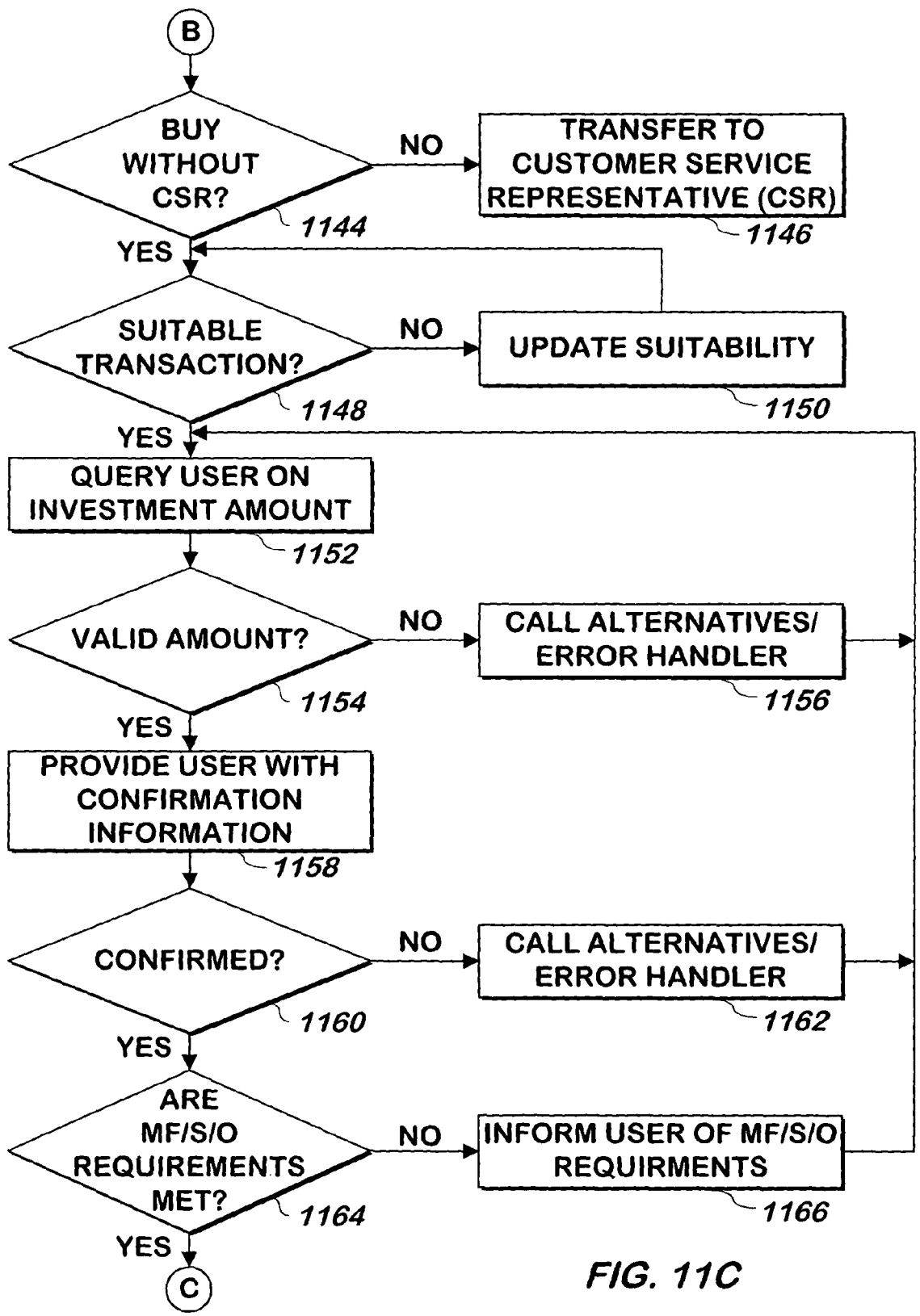
Figure 11D:
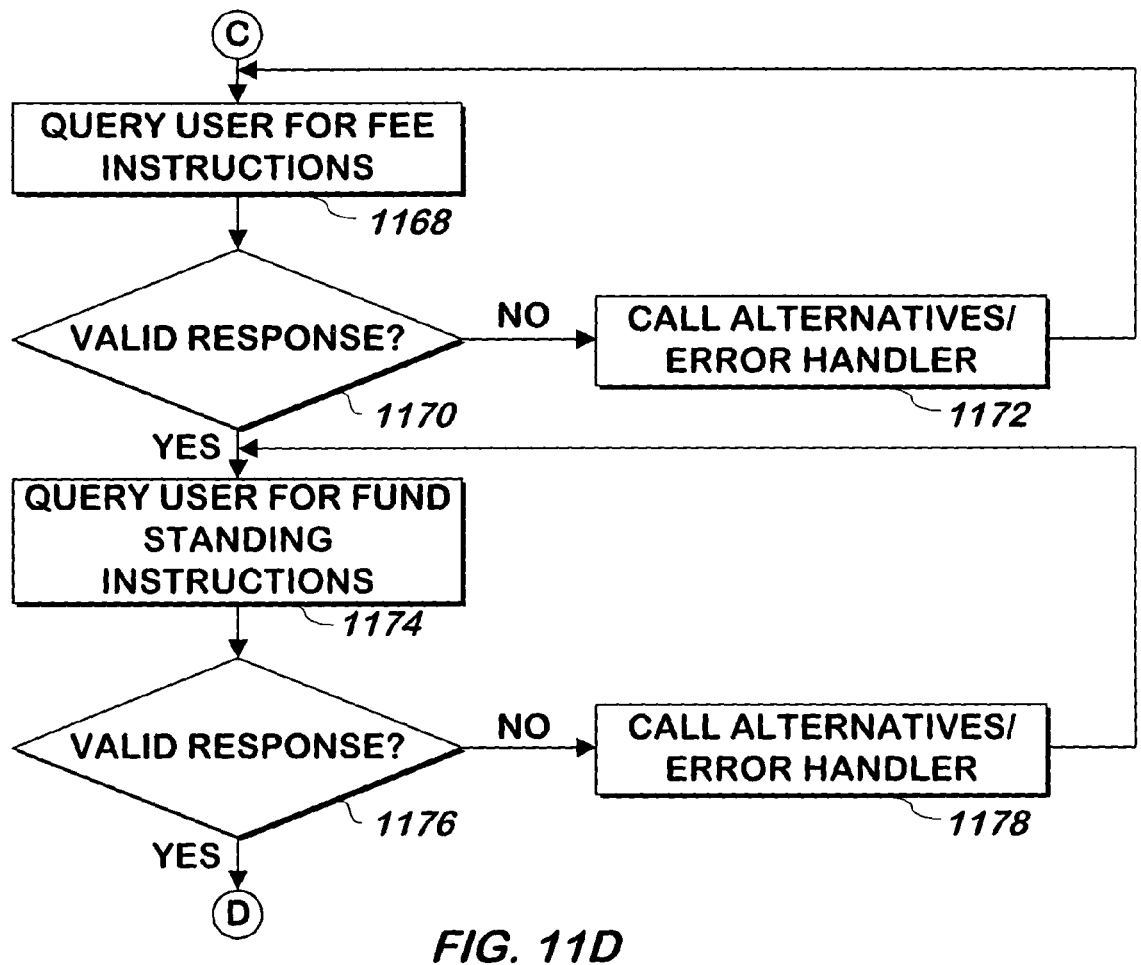

As described above, if, when the selection module 210 has process control, the spoken term indicates that the user wants to obtain an option quote, the selection module 210 calls 714 the option quote module 216. The process performed by the option quote module 216 is now described. FIG. 10 is a flow chart illustrating a process performed by an option quote module 216 according to a preferred embodiment of the present invention. The option quote module 216 queries 1002 the user on the type of option quote, e.g., short or full option quotes. Short and full option quotes differ in the amount of information transmitted to the user, as described above. If the spoken term is not a valid option type 1004 the option quote module 216 calls 1006 the alternatives/error handler 206. If the spoken term is a valid option type 1004 the option quote module 216 queries 1008 the user on the underlying issue and parameters of the options. In the preferred embodiment the underlying issue that the user provides is the name of the underlying entity and can be a stock name or an index name. In alternate embodiments additional options can be traded, e.g., index options. The parameters that the user provides include: (1) the expiration month—which is the calendar month in which an option expires if exercise instructions have not been received; (2) the strike (exercise) price—which is the predetermined price at which the underlying entity can be bought or sold upon exercise; (3) the type of option—which is the classification of an option as either a put option or a call option; and (4) the expiration year—which is the year in which the option expires and is necessary for some long terms options and warrents. In the preferred embodiment the user can provide the underlying issue and parameters in a single sentence, i.e., without having the option quote module 216 prompt the user for the underlying issue and each parameter. Alternatively, the user can be requested to provide the underlying issue and each parameter individually or the user can provide some information and the option quote module 216 will determine what information is missing and can request only that information.

Alternatively, a stocklist for options can be used. The process for quoting the stocklist is similar to the process in FIG. 10 except that the spoken term identifies 1008 a stocklist. The stocklist is a list of option names and underlying issues and parameters. The process for creating and modifying a stocklist for options is similar to the process described above with reference to stocklist module 214 with an option stocklist storing additional information, e.g., the underlying issues and parameters.

After the user speaks the name of the underlying issue and parameters, the options module 216 determines 1010 whether the spoken term is a valid response. If not, the option quote module 216 calls 1012 the alternatives/error handler 206. If the spoken term is a valid response the option quote module 216 obtains 1014 the underlying option quote information from the quote database 150 using a technique that is similar to the quote retrieving technique described above. The option quote module 216 then provides 1016 the quote information to the user via the VPS 103. In the preferred embodiment the option quote module 216 asks 1008 the user for another underlying issue and parameters. If the user wants to trade the option the user can speak the word "trade." However, in an alternate embodiment the default is that the user will be asked if the user wants to trade the option and the process continues at step 1112 in FIG. 11, described below.

As described above, if, when the selection module 210 has process control, the spoken term indicates that the user wants to perform a trade, the selection module 210 calls 714 the trade module 218. The process performed by the trade module 218 is now described. FIGS. 11A-D are flow charts illustrating a process performed by a trade module 218 according to a preferred embodiment of the present invention. If the user requests to perform a trade the trade module 218 queries 1102 the user on the name of the financial instrument to trade, e.g., stock, mutual fund, option, future, commodity, unit investment trust (UIT), real estate investment trust (REIT), foreign currency, real property, or precious metal, for example. The trade module 218 determines 1104 if the spoken term represents a valid financial instrument. If not, the trade module 218 calls 1106 the alternatives/error handler 206. If the spoken term does represent a valid financial instrument the trade module 218 obtains 1108 quote information for the financial instrument. Some techniques for obtaining quote information are described above. The trade module 218 then informs 1110 the user of the quote information and asks 1112 the user for the trade type, e.g., buy or sell. If the received spoken term indicates 1114 that the user wants a quote on another financial instrument the trade module 218 returns to step 1102. If not, the trade module 218 determines whether the spoken term indicates that the user wants to either buy 1116 or sell 1118. If the spoken term does not correspond to either buying or selling the trade module 218 calls 1120 the alternatives/error handler.

If in response to the query 1112 for the trade type the spoken term, i.e., the interpretation of the user's response, is to buy, the trade module 218 determines 1144 (FIG. 11C) whether the trade is permitted without the help of a customer service representative. If a customer service representative is necessary, the trade module 218 transfers 1146 the user. Some trades may require a customer service representative, for example swapping certain mutual funds, buying an initial public offering (IPO) of an equity which requires document receipt beforehand, buying a non-listed security, or buying foreign securities. If a customer service representative is not necessary the trade module 218 determines 1148 whether the proposed transaction is suitable for the user. A buy transaction can be compared with suitability factors to determine whether the transaction is consistent with the financial goals of the user. Suitability factors can include (1) investment objectives, e.g., capital preservation, income, growth, or speculation; (2) annual income; (3) liquid net worth; and (4) tax bracket. A transaction is suitable if the financial instrument to be bought is consistent with the financial goals of the user given the above factors, for example.

If the trade module 218 determines 1148 that the transaction is not suitable for the user the trade module 218 will attempt to update 1150 the suitability factors of the user. Information concerning the suitability of the transaction is sent to the user and the user is then prompted to update the suitability factors. The user has the option of not providing information relating to any or all of the suitability factors. When the user does not provide complete information the trade module 218 informs the user that the VoiceBroker™ system 100 cannot determine the suitability of the transaction. However, the user will be permitted to continue the trade.

If the transaction is suitable 1148 or if the user wants to disregard the warnings of a non-suitable transaction or if the trade module 218 cannot determine if the transaction is suitable, the trade module 218 queries 1152 the user on the investment amount. If the spoken term is not a valid amount, e.g., if the amount exceeds a predetermined limit for the user, the trade module 218 calls 1156 the alternatives/error handler 206. Otherwise the trade module 218 provides 1158 the user with the trade information and asks the user to confirm the transaction. If the user does not confirm the transaction 1160 the trade module 218 calls 1162 the alternatives/error handler 206. If the spoken term indicates that the user confirms the transaction the trade module 218 determines 1164 if the buying requirements for the financial instrument is satisfied— some financial instruments require a minimum purchase amount. If the buying requirements are not met the trade module 218 informs 1166 the user of such requirements and asks 1152 the user to enter a new investment amount.

If the buying requirements are satisfied the trade module 218 informs the user of the transaction fee and queries 1168 (FIG. 11D) the user for fee instructions. Examples of fee instructions include adding the fee to the transaction amount and subtracting the fee from the transaction amount. If the spoken term does not represent a valid fee instruction 1170 the trade module 218 calls 1172 the alternatives/error handler 206. If the spoken term does represent a valid fee instruction 1170 then the trade module 218 queries 1174 the user for fund standing instructions. Examples of fund standing instructions include having capital gains, dividends, or distributions, from the financial instrument reinvested or paid as cash. If the spoken term does not represent a valid response 1176 from the user the trade module 218 calls 1178 the alternatives/error handler 206. If the spoken term does represent a valid response 1176 the trade module 218 provides 1136 (FIG. 11B) the user with the confirmation information and requests that the user confirm the transaction. If the spoken term indicates 1138 that the user confirmed the transaction the trade module 218 executes 1140 the order and the transaction is complete. If the spoken term indicates that the user did not confirm the transaction the trade module 218 cancels the order. The trade module 218 then repeats its process and queries 1102 the user for the name of a financial instrument to trade.

If in response to the query 1112 for the trade type the spoken term corresponds to a sell request, the trade module 218 determines 1122 if the user owns the financial instrument identified in step 1104. If the user does not own the financial instrument the trade module 218 informs 1124 the user of this fact and queries 1102 the user for another financial instrument. If the financial instrument is valid 1122, the trade module 218 queries 1130 (FIG. 11B) the user for the quantity to sell. If the spoken response is not a valid quantity, e.g., if the quantity is more than the user owns, or if the user spoke another term (e.g., "help"), then the trade module 218 calls 1134 the alternatives/error handler 206. If the quantity is valid 1132 the trade module 218 provides 1136 the user with the confirmation information and requests that the user confirm the transaction. If the spoken term indicates 1138 that the user confirmed the transaction the trade module 218 executes 1140 the order and the transaction is complete. If the spoken term indicates that the user did not confirm the transaction the trade module 218 cancels the order. The trade module 218 then repeats its process and queries 1102 the user for the name of a financial instrument to trade.

While the invention has been particularly shown and described with reference to a preferred embodiment, it will be understood by persons skilled in the relevant art that various changes in form and details can be made therein without departing from the spirit and scope of the invention.

What is claimed is:

1. A computer-implemented method of trading at least one financial instrument, comprising:

receiving via a microphone at a computer system coupled to the microphone at least one spoken identifier of a user;

establishing an identity of the user responsive to at least one of the at least one spoken identifier;

receiving at least one spoken command to trade at least one financial instrument, between the user whose identity was established and at least one other party capable of trading that at least one financial instrument;

identifying a type of trade and at least one financial instrument the user wishes to trade responsive to the at least one spoken command and a set of spokenopita, comprising:

speech recognition elements useful for recognizing terms a speaker is most likely to speak at such time as the speaker wishes to trade at least one financial instrument, comprising at least one term indicating the speaker wishes to buy a financial instrument and at least one term indicating the speaker wishes to sell a financial instrument; and speech recognition elements useful for recognizing a plurality of identifiers for each of a plurality of financial instruments capable of being traded;

establishing a validity of at least one of the type of trade and the at least one financial instrument the user wishes to trade; and responsive to the establishing the validity step and the establishing the identity step, performing the type of trade for the at least one financial instrument.

2. The method of claim 1 wherein the establishing the validity step comprises identifying whether the user owns the at least one financial instrument being traded.

3. The method of claim 1 wherein the establishing the validity step comprises establishing whether at least one selected from the type of trade and the at least one financial instrument matches the user's investment goals.

4. The method of claim 1:

wherein the establishing the validity step comprises identifying whether at least one selected from the type of the trade and trades for the at least one financial instrument require assistance to be performed; and the method additionally comprising transferring the user to an individual responsive to the identifying whether at least one selected from the type of the trade and trades for the at least one financial instrument require assistance to be performed step.

5. The method of claim 1 wherein the establishing the validity step comprises identifying whether a threshold amount owned, corresponding to at least one of the type of the trade and at least one of the at least one financial instrument, has been met.

6. The method of claim 1 additionally comprising receiving spoken transaction fee instructions from the user.

7. A system for trading at least one financial instrument, comprising:

an identifier subsystem having an input for receiving at least one spoken identifier of a user, the identifier subsystem for establishing an identity of the user responsive to the spoken identifier;

a selector having an input for receiving at least one spoken command to trade at least one financial instrument between the user whose identity was established and at least one other party capable of trading that at least one financial instrument, the selector for identifying a type of trade responsive to the spoken command and a set of spokenopita received at a spokenopita input, the spokenopita comprising:

speech recognition elements useful for recognizing terms a speaker is most likely to speak at such time as the speaker wishes to trade at least one financial instrument, comprising at least one term indicating the speaker wishes to buy a financial instrument and at least one term indicating the speaker wishes to sell a financial instrument; and speech recognition elements useful for recognizing a plurality of identifiers for each of a plurality of financial instruments capable of being traded; and a trader coupled to the selector and the identifier subsystem having an input for receiving at least one spoken identifier of at least one financial instrument the user wishes to trade, the trader for:

identifying the at least one financial instrument responsive to the at least one identifier and the set of spokenopita;

establishing a validity of at least one of the type of trade and the at least one financial instrument the user wishes to trade; and responsive to the validity established and the identity of the user, performing the type of trade for the at least one financial instrument.

8. The system of claim 7 wherein the trader establishes the validity by identifying whether the user owns the at least one financial instrument being traded.

9. The system of claim 7 wherein the trader establishes the validity by establishing whether at least one selected from the type of trade and the at least one financial instrument matches the user's investment goals.

10. The system of claim 7:

wherein the trader establishes the validity by identifying whether at least one selected from the type of the trade and trades for the at least one financial instrument require assistance to be performed and the trader is additionally for signaling at an output responsive to the at least one selected from the type of the trade and trades for the at least one financial instrument identified as requiring assistance to be performed; and the system additionally comprising an exceptions/error module coupled to the trader, the error/exceptions module for transferring the user to an individual when signaled at the error/exceptions input.

11. The system of claim 7 wherein the trader establishes the validity by identifying whether a threshold amount owned, corresponding to at least one of the type of the trade and at least one of the at least one financial instrument, has been met.

12. The system of claim 7, wherein the trader is additionally for receiving spoken transaction fee instructions.

13. A system for trading at least one financial instrument, comprising:

means for receiving at a computer system at least one spoken identifier of a user;

means for establishing an identity of the user responsive to at least one of the at least one spoken identifier;

means for receiving at least one spoken command to trade at least one financial instrument, between the user whose identity was established and at least one other party capable of trading that at least one financial instrument;

means for identifying a type of trade and at least one financial instrument the user wishes to trade responsive to the at least one spoken command and a set of spokenopita, comprising:

speech recognition elements useful for recognizing terms a speaker is most likely to speak at such time as the speaker wishes to trade at least one financial instrument, comprising at least one term indicating the speaker wishes to buy a financial instrument and at least one term indicating the speaker wishes to sell a financial instrument; and speech recognition elements useful for recognizing a plurality of identifiers for each of a plurality of financial instruments capable of being traded;

means for establishing a validity of at least one of the type of trade and the at least one financial instrument the user wishes to trade; and means for, responsive to the establishing the validity step and the establishing the identity step, performing the type of trade for the at least one financial instrument.

* * * * *